US005925834A

United States Patent [19]
Sgourakes

[11] Patent Number: 5,925,834
[45] Date of Patent: Jul. 20, 1999

[54] AUTOSAMPLER SYRINGE WITH COMPRESSION SEALING

[75] Inventor: George E. Sgourakes, Millis, Mass.

[73] Assignee: Waters Investments Limited, New Castle, Del.

[21] Appl. No.: 08/991,041

[22] Filed: Dec. 16, 1997

[51] Int. Cl.[6] .......... G01N 1/14

[52] U.S. Cl. .......... 73/864.11

[58] Field of Search .......... 73/864.01, 864.11, 73/864.13, 864.16, 864.17, 864.35, 864.62; 422/100; 141/25–27; 92/109, 110, 182, 181 P, 61

[56] References Cited

U.S. PATENT DOCUMENTS

| | | |
|---|---|---|
| 3,933,048 | 1/1976 | Scordato . |
| 3,972,683 | 8/1976 | Lape . |
| 4,082,121 | 4/1978 | Oxford . |
| 4,616,514 | 10/1986 | Magnussen, Jr. et al. . |
| 4,625,572 | 12/1986 | Kaisha . |
| 4,660,569 | 4/1987 | Etherington . |
| 5,104,624 | 4/1992 | Labriola . |

*Primary Examiner*—Robert Raevis
*Attorney, Agent, or Firm*—Brian L. Michaelis; Anthony J. Janiuk

[57] ABSTRACT

A fluid transfer device includes a cylinder and a displacement rod. The cylinder is fabricated rigid enough to minimize distortion of volume yet compliant enough to create a seal between itself and the surface of the displacement rod. The cylinder is constructed with a bore hole through its central portion running from end to end. The diameter of the bore hole is larger than the diameter of the displacement rod. The displacement rod is constructed of a rigid material. At least one end of the cylinder has a diameter reduced so the diameter of the bore hole and the diameter of the displacement rod are substantially the same to form a seal with each other. As the displacement rod is withdrawn from the bore hole, a sample is drawn into the bore hole. The volume of the sample drawn into the bore hole is a function of the volume of the displacement rod withdrawn from the bore hole. A cross hole, for venting undesired fluid such as gas bubbles or previous sample(s), is located on the displacement rod. The cross hole is connected to a passageway through the inside of the displacement rod leading to an opening on its surface which is outside of the cylinder.

12 Claims, 5 Drawing Sheets

AUTOSAMPLER SYRINGE WITH COMPRESSION SEALING

FIELD OF THE INVENTION

The present invention relates to liquid chromatography apparatus, and more particularly to a syringe used by an autosampler to acquire samples of liquids.

BACKGROUND OF THE INVENTION

In various analytical procedures, including liquid chromatography, a large number of liquid samples are processed sequentially in the same apparatus. An autosampler is used to obtain samples of liquids which are to be analyzed. The autosampler typically uses a syringe to acquire the sample. Performance of autosamplers is significantly influenced by the accuracy of sample acquisition and wear resistance of the syringe. Various configurations of syringes used to obtain liquid samples are known in the art.

An example of one type of known syringe is generally illustrated in FIG. 1. This prior syringe comprises a cylinder 10, having a first and a second end. The cylinder 10 is typically made of glass. The cylinder 10 has a bore hole 12 through its central portion which extends from the first end to the second end. A piston 14 which enters the bore hole 12 through the first end of the cylinder 10, is configured to slide in and out of the bore hole 12. A plunger 16 is attached to the piston 14 at an end portion thereof and is configured to be inserted for slidable engagement in the bore hole 12. The plunger 16 is typically made of Teflon. The area where the plunger 16 and the bore hole 12 come into contact creates a liquid tight seal. As the piston 14 is pulled out of the bore hole 12, the plunger 16 creates a vacuum which draws a sample into the bore hole. This necessitates that the bore hole 12 and the plunger 16 be fabricated within strict tolerances to achieve desired accuracy of sample.

A metal coupling 20 is disposed at the second end of the cylinder 10. A portion of the metal coupling 20 is threaded for attachment to mechanisms for initially receiving the acquired sample e.g., hose, needle (not shown). The metal coupling 20 has a Teflon seal 22 which serves to seal the connection between the glass 10 and the receiving mechanisms.

During the initial operation or process of collecting samples, undesired fluid such as gas bubbles or prior liquids may collect inside the bore hole 12. The presence of undesired fluid in the bore hole 12 can, among other things, adversely influence the accuracy of delivery of the syringe. In prior art syringes, it is a difficult task to remove the entrapped undesired fluid. To purge undesired fluid from the bore hole 12 the piston 14 and plunger 16 must be manually removed from the bore hole 12. Fluid may spill out and compromise the integrity and cleanliness of the fluid delivery system. Furthermore, removal of undesired fluid such as gas bubbles, typically cannot be done in an automated mode.

Additionally, in the prior art syringe illustrated in FIG. 1, the accuracy of the bore hole 12 is poor as its precision is limited by many factors in the manufacturing process. Present practice is to heat shrink a glass tube onto a wire mandrel. The wire mandrel diameter changes as it wears during extraction from the glass tube after cooling. The coefficients of thermal expansion vary from lot to lot and according to temperature variations so that producing a wire mandrel to a precision diameter is difficult. All of these factors result in an influence or potential variability of 1.22% in volume for a 250 microliter syringe. It would be very costly to reduce this influence because it would cause a high rejection rate to the vendor.

Another problem associated with the illustrated prior art syringe is that the plunger 16 on the piston 14 is influenced by friction with the bore hole 12.

This friction can distort the plunger 16 by varying amounts dependent upon the coefficient of friction of the bore hole. An engineering estimate from finite element analysis indicates approximately 0.5% variability due to friction at 1 microliter injections. Still further, the Teflon seal 22 at the coupling 20 expands as the temperature rises, and because it is confined it has a tendency to yield. As the temperature of the Teflon seal 22 drops, the seal contracts, sealing pressure of the seal drops and the seal will leak. Also, if there is a long time period between draws to fill the syringe, the bore dries out and can influence precision by varying friction. Variability of friction can lead to premature wear.

Another prior art syringe is disclosed in U.S. Pat. No. 4,625,572 (the '572 patent). The '572 patent provides a cylinder pump for an automatic chemical analyzer or the like, which comprises a cylinder and a plunger. Both the cylinder and plunger are made of a rigid material. They are coupled together in a liquid tight sliding contact with each other without any elastic member such as an o-ring interposed between the sliding contact surfaces. Because the plunger and cylinder must be coupled together in a liquid tight sliding contact, both must be machined within strict tolerances. Machining the plunger and cylinder within strict tolerances is an expensive process.

The '572 patent discloses the use of substantially the same material for both the cylinder and the plunger to maintain strict tolerances. This limits the effectiveness of the cylinder pump by necessitating the use of materials which are acceptable for both a plunger and a cylinder and may not be transparent. A compromise results in that materials can not be used which are ideally suited for use respectively as a plunger or a cylinder. The '572 patent also requires that the contact surfaces of both the cylinder and the plunger be polished to a mirror-like finish. This further complicates manufacturing and increases the cost of the cylinder pump.

Furthermore, the '572 patent provides no mechanism for removal of undesired fluid from the bore hole. Undesired fluid trapped in the bore hole can significantly reduce the accuracy of pumped volumes, and negatively affects the efficiency of the subsequent analysis of samples.

SUMMARY OF THE INVENTION

The present invention provides a fluid transfer apparatus having integrated end sealing which is inexpensive to manufacture, highly accurate and lasts significantly longer than previous fluid transfer devices.

According to the invention a fluid transfer device is provided for use in an autosampler. The fluid transfer device comprises a cylinder having integrated end seals sealing a displacement rod. The cylinder according to the invention is fabricated of a material such as Ultra High Molecular Weight (UHMW) plastic or the like which is rigid enough to minimize distortion of volume yet compliant enough to create a seal between itself and the surface of the displacement rod. The cylinder, has a first sealing end and a second sealing end, and is constructed as an integrated structure with a bore hole through its central portion, running from end to end. The diameter of the bore hole is larger than the diameter of the displacement rod. The bore hole according to the invention does not need to be machined to any special tolerances. The displacement rod is constructed of a rigid material and is dimensioned as a function of the volume of fluid that is desired to be displaced through the syringe. At the first end of the cylinder the diameter of the cavity decreases until the diameter of the cavity and the diameter of the displacement rod are substantially the same so as to form a compression seal between the rod and syringe.

The second end of the cylinder has an integrated externally threaded coupling configured to be attached to mechanisms for receiving the acquired sample, such as a needle or hose(s). As the displacement rod is withdrawn from the bore hole, a sample is drawn into the fluid transfer device. The volume of the sample drawn into the bore hole will be substantially the same as the volume of the displacement rod withdrawn from the bore hole. Additionally, a cross hole, for venting gas bubbles or other undesirable fluids (e.g. left over previous liquid(s)), is located on the displacement rod at a point so that it may be positioned inside the bore hole. The cross hole is connected to a passageway through the inside of the displacement rod leading to an opening on the surface of the displacement rod which, when the rod is in an appropriate position, leads outside of the cylinder. Thus undesired fluid inside the bore hole can be vented when the cross hole is appropriately positioned within the bore and a flow is induced by a slight positive pressure.

In an alternative embodiment according to the invention, a differential displacement configuration is provided wherein the inner diameters of seals disposed at extreme ends of a cylinder have different dimensions, to accommodate a displacement rod having different outer diameter dimensions. The displacement rod has two different outer diameters to allow very low volume samples to be drawn without requiring an unmanageably small diameter displacement rod.

Features of the invention include provision of a syringe having increased accuracy, lower cost and increased longevity. The entire cylinder portion can be fabricated as a unitary structure having external compression sealing which simplifies the manufacturing process, provides enhanced sealing and saves money. The syringe is configured with a bore hole inner diameter that is not critical thus saving the substantial cost and avoiding the complexities of manufacturing associated with maintaining precise tolerances. The seal created by the displacement rod and the cylinder wears more slowly than prior seals and is effectively retained by compressive forces exerted continuously on the exterior of the seal area. This results in a significant improvement in seal longevity over prior fluid transfer devices. In addition, the present invention allows the use of an automatic gas purge. By allowing for the automatic release of undesired fluid from the bore hole the present invention further increases accuracy over prior devices.

BRIEF DESCRIPTION OF THE DRAWING

The foregoing and other features and advantages of the present invention will be more fully understood from the following detailed description of illustrative embodiments, taken in conjunction with the accompanying drawing in which.

DETAILED DESCRIPTION

Figure 1:
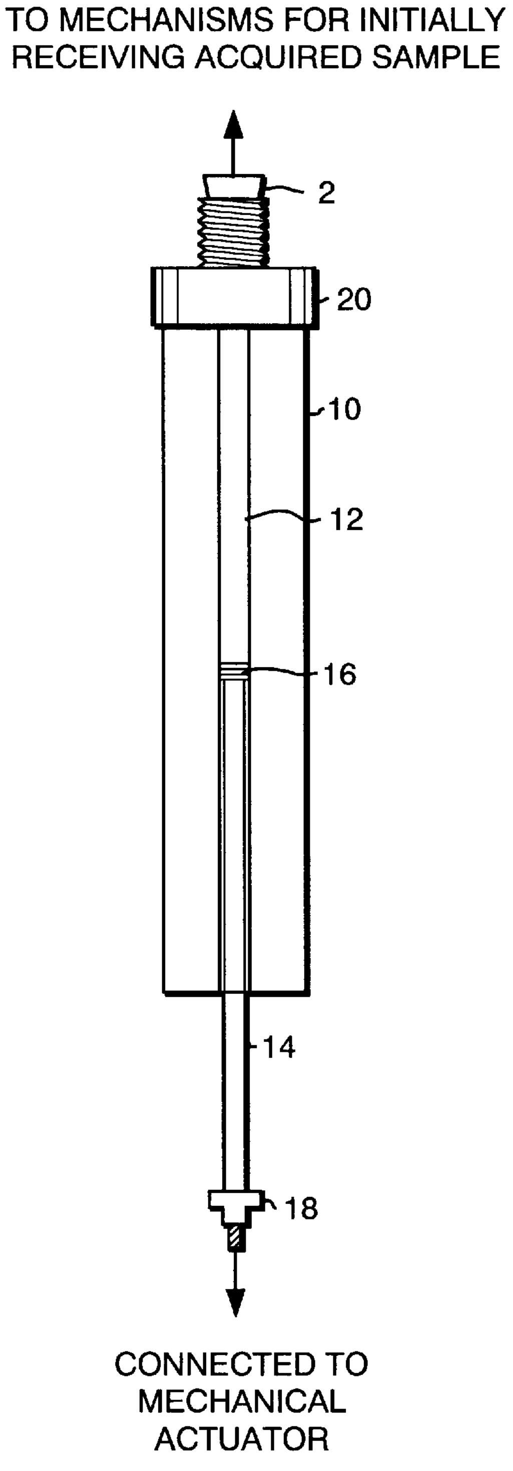
FIG. 1 (PRIOR ART)
FIG. 1 is an illustration of a prior art autosampler syringe.
Figure 2:
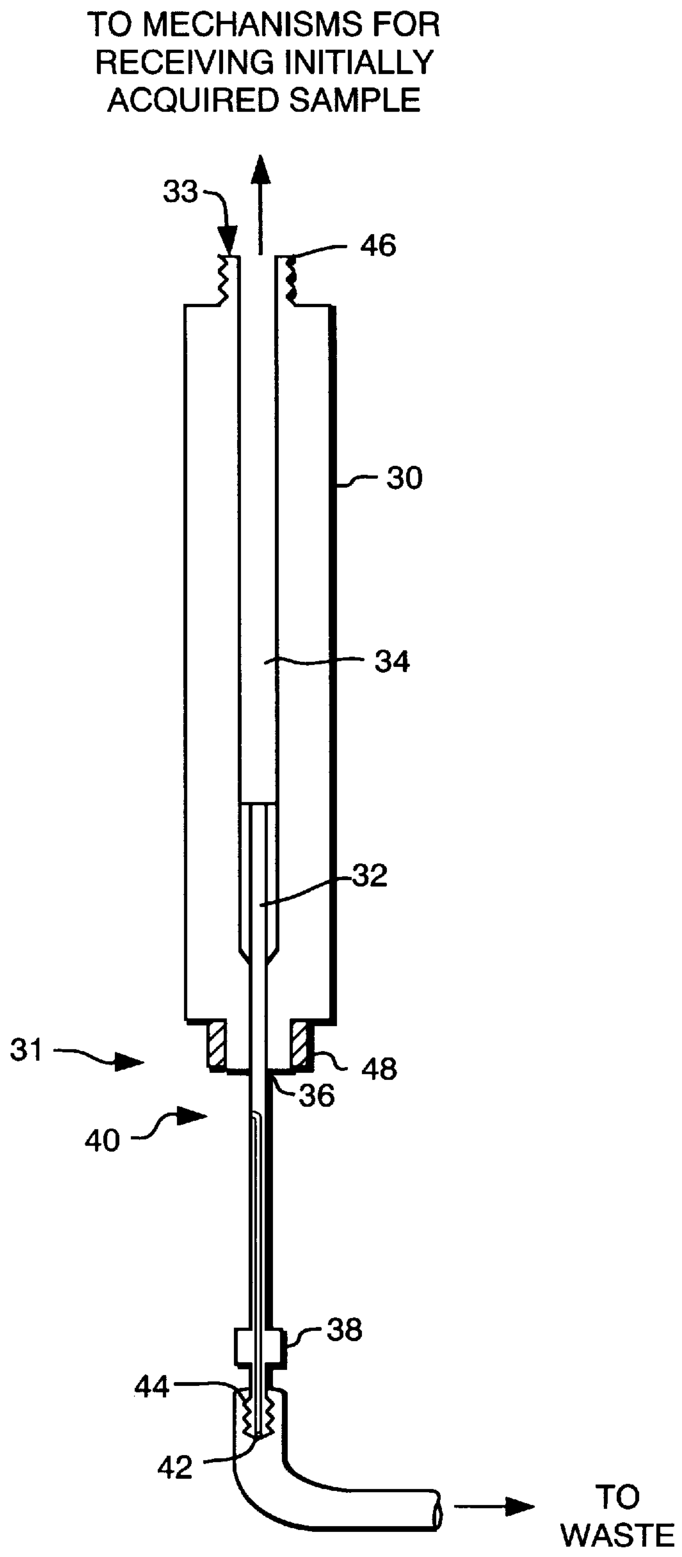
FIG. 2 is an illustration of an autosampler syringe according to present invention.

An autosampler syringe of the present invention is generally illustrated in FIG. 2. In this illustrative embodiment, a syringe is shown comprising a cylinder 30, having unitary, integral first end 31 and second end 33, and a displacement rod 32. The cylinder 30 has a bore hole 34 through its central portion which extends from the first end 31 to the second end 33. In the present invention no critical bore tolerance is required, as bore sealing is not a function of the internal bore diameter, thus significantly lowering cost of manufacturing the presently disclosed syringe. A constant area seal 36 is located at the first end 31 of the cylinder 30. In this illustrative embodiment, the constant area seal 36 and the cylinder 30 are manufactured as a unitary structure further reducing manufacturing costs. The displacement rod 32 is slidably inserted in the bore hole 34 through a hole in the constant area seal 36. The outside diameter of the displacement rod is dimensioned to tightly yet slidably contact the constant area seal 36 to form a substantially liquid tight seal. Accordingly, there is no wear between the displacement rod 32 and the inner walls of the bore hole 34 because they do not come into contact with each other. The cylinder in this illustrative embodiment is unitarily produced using Ultra High Molecular Weight Plastic.

A fitting portion 38 of the displacement rod 32 remains outside of the cylinder 30 and has a fitting either mechanically fastened to or unitarily integrated with the displacement rod 32. The fitting 38 is configured to be connected to a mechanical actuator as a function of the instrument in which the autosampler syringe is to be installed. The mechanical actuator, as known in the art, moves the displacement rod 32 in or out of the bore hole 34 to acquire or expel a sample. The displacement rod 32 has a crosshole 40 at a point where it can either be positioned inside the bore hole 34 or outside of the constant area seal 36. When the cross hole 40 is positioned outside the constant area seal 36 it has no effect on the drawing in or discharge of a sample. When the cross hole 40 is positioned inside the bore hole 34, it allows undesired fluid trapped inside the bore hole 34 to be vented. Undesired fluid is vented to outside the bore hole 34 through a pathway inside the displacement rod 32 to the end of the displacement rod 32 and through a vent hole 42. The fitting portion 38 has a ridged end 44 or other means of connection so that a flexible hose or other conduit can be attached for the purpose of diverting undesired fluid to a waste containment area (not shown).

The second end 33 of the cylinder 30 is formed into a threaded protrusion 46 for attachment to known mechanisms for receiving the acquired sample (not shown). The threaded protrusion 46 in this illustrative embodiment also acts as a static seal between the cylinder 30 and the receiving mechanisms. The static seal will not lose its integrity upon undergoing heating and cooling as does the Teflon seal used by many prior art fluid transfer devices as it is unitary and integral to the cylinder and does not involve engagement of materials having significantly dissimilar coefficients of thermal expansion.

In an alternative embodiment, referring still to FIG. 2, a split ring c-shaped clamp 48 is placed around the constant area seal 36 to further increase the efficacy and longevity of the seal. The split ring c-shaped clamp 48 serves to exert a force on the constant area seal 36 and in the event of any wear between the constant area seal 36 and the displacement rod 32, the split ring c-shaped clamp 48 exerts continuous external forces on the constant area seal to maintain sealing engagement between the seal 36 and the displacement rod 32. This configuration maximizes the length of time that the seal is maintained before replacement is necessary.

Figure 3:
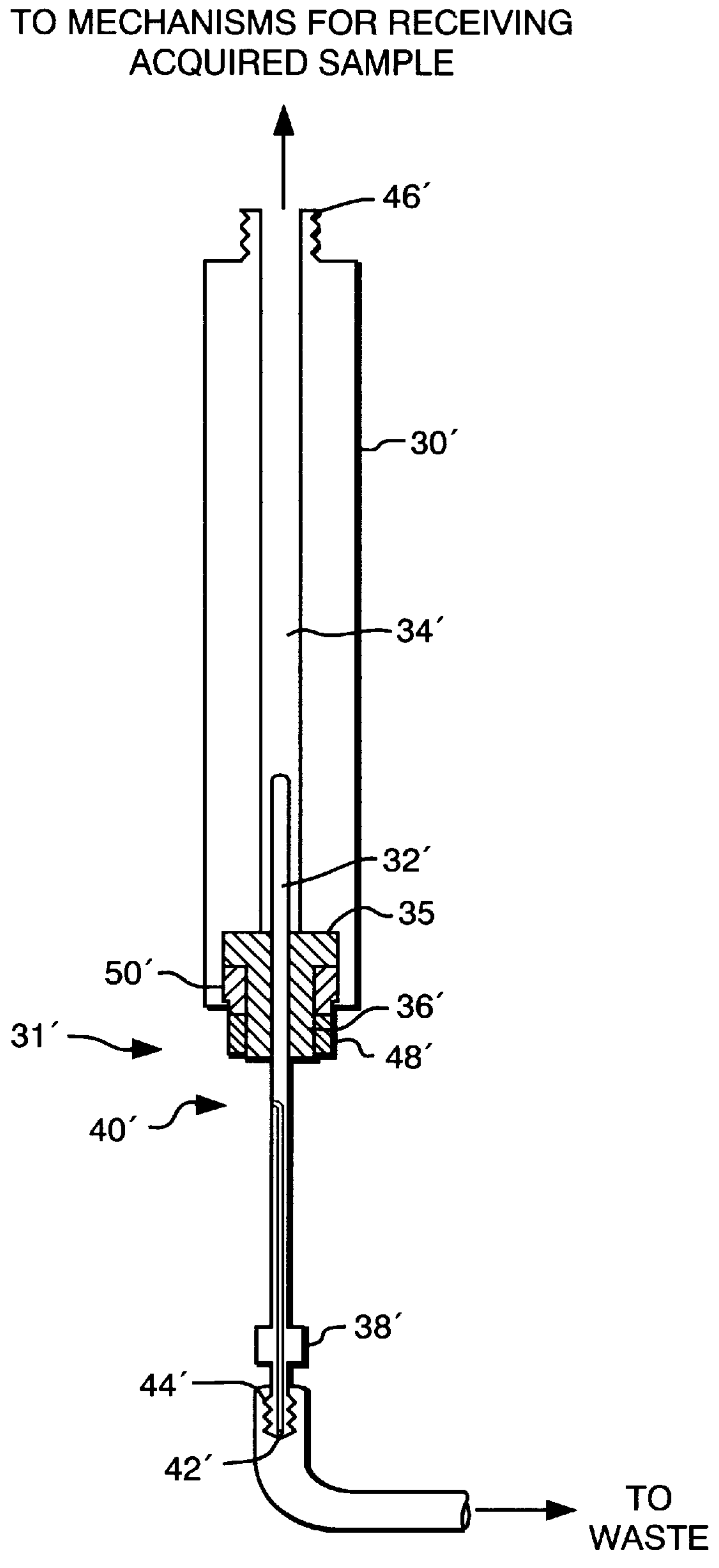
FIG. 3 is an illustration of an alternative embodiment of an autosampler syringe according to the present invention.

Another alternative embodiment of this invention is illustrated in FIG. 3. A cylinder 30' and seal 36' are provided as a non-unitary structure. The cylinder 30' is constructed of a material which will provide high rigidity such as a metal like stainless steel or a plastic such as polyetheretherketone (PEEK). The constant area seal 36' is constructed of Teflon or another material with a substantially low coefficient of friction. In this embodiment the constant area seal 36' is seated in abutment against a surface 35 of the cylinder 30'. The seal 36' is attached to the first end of the cylinder 30' with a Belleville washer 50'.

A split ring c-shaped clamp 48' can be placed around the constant area seal 36' to provide continuous external forces and further increase the efficacy and longevity of the seal 36'. The split ring c-shaped clamp 48' serves to exert a force on the constant area seal 36' so that in the event of any wear between the constant area seal 36' and the displacement rod 32', the split ring c-shaped clamp 48' ensures that the seal will be maintained.

Figure 4:
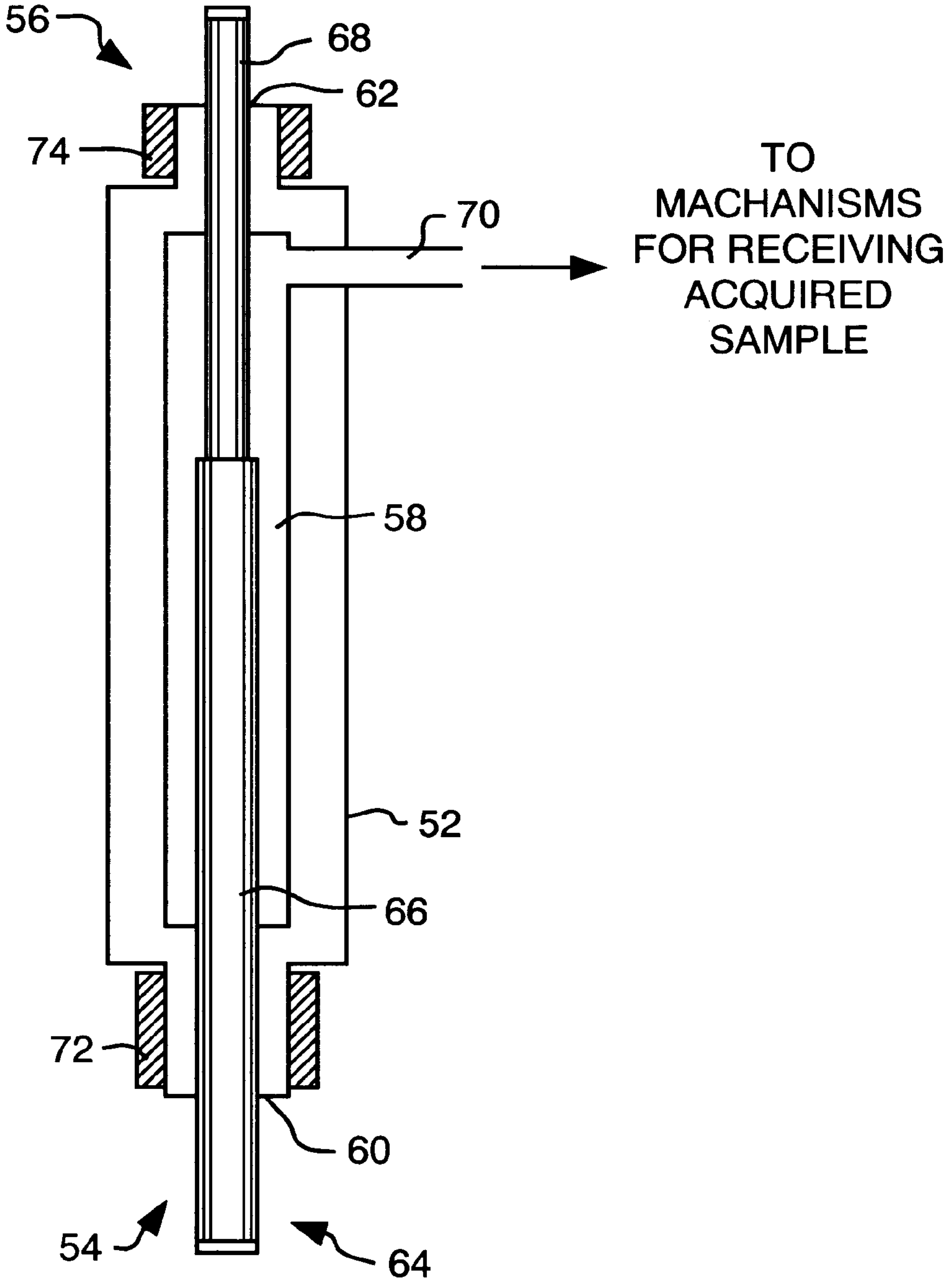
FIG. 4 is an illustration of another alternative embodiment of an autosampler syringe according to the present invention configured as a differential displacement syringe.

Still another alternative embodiment is illustrated in FIG. 4. A differential displacement configuration is shown, according to the invention, comprising a cylinder 68, having a first end 54 and a second end 56 and a displacement rod 64. The cylinder 52 has a bore hole 58 through its central portion which extends from the first end 54 to the second end 56. In this alternative embodiment, as in the aforementioned embodiments, no critical bore tolerance is required, as sample volume is not a function of the internal bore diameter. The cylinder 52 has a first constant area seal 60 located at the first end 54 and a second constant area seal 62 located at the second end 56.

The displacement rod 64, having a larger diameter portion 66 and a smaller diameter portion 68 is slidably inserted through an opening in the first constant area seal 60 and through an opening in the second constant area seal 62, so that part of the larger portion 66 of the displacement rod 64 and part of the smaller portion 68 of the displacement rod 64 fits inside the cylinder 52. The larger diameter portion 66 and the smaller diameter portion 68 of the displacement rod 64 create a fluid tight seal with the inside sealing surfaces of the first constant area seal 60 and the second constant area seal 62, respectively.

A fluidic connection 70 is located on the cylinder 52. The fluidic connection 70 is configured to be connected to a mechanism for receiving an acquired sample. When the larger diameter portion 66 of the displacement rod 64 is slid out of the cylinder 52 a sample is drawn into the bore hole 58 through the fluidic connection 70. The sample drawn is a function of the difference in diameter between the larger diameter portion 66 and the smaller portion 68 of the displacement rod 64 and the magnitude to which the displacement rod 64 is drawn from the cylinder 52. This allows very low volume samples to be drawn without requiring an unmanageably small diameter displacement rod.

Additionally, a first and second split ring c-shaped clamp 72, 74 can be placed around the first and second constant area seal 60, 62, respectively, to provide continuous external forces and further increase the efficacy and longevity of the seal 60, 62. The first split ring c-shaped clamp 72 serves to exert a force on the first constant area seal 60 so that in the event of any wear between the first constant area seal 60 and the larger portion 66 of the displacement rod 64, the first split ring c-shaped clamp 72 ensures that the seal 60 will be maintained. The second split ring c-shaped clamp 74 serves to exert a force on the second constant area seal 62 so that in the event of any wear between the second constant area seal 62 and the smaller portion 68 of the displacement rod 64, the second split ring c-shaped clamp 74 ensures that the seal 62 will be maintained. The purge capability including the cross-hole illustrated in FIG. 2 and FIG. 3 (although not shown in FIG. 4) can also be implemented.

Although the device described herein above is shown with reference to its use in an autosampler, it may be used in other applications to transfer fluid.

Although the illustrative embodiment described herein includes a cylinder made of Ultra High Molecular Weight plastic, one skilled in the art would appreciate that other materials that are rigid but create a seal with the displacement rod may be used such as PEEK or other inert material.

Figure 5:
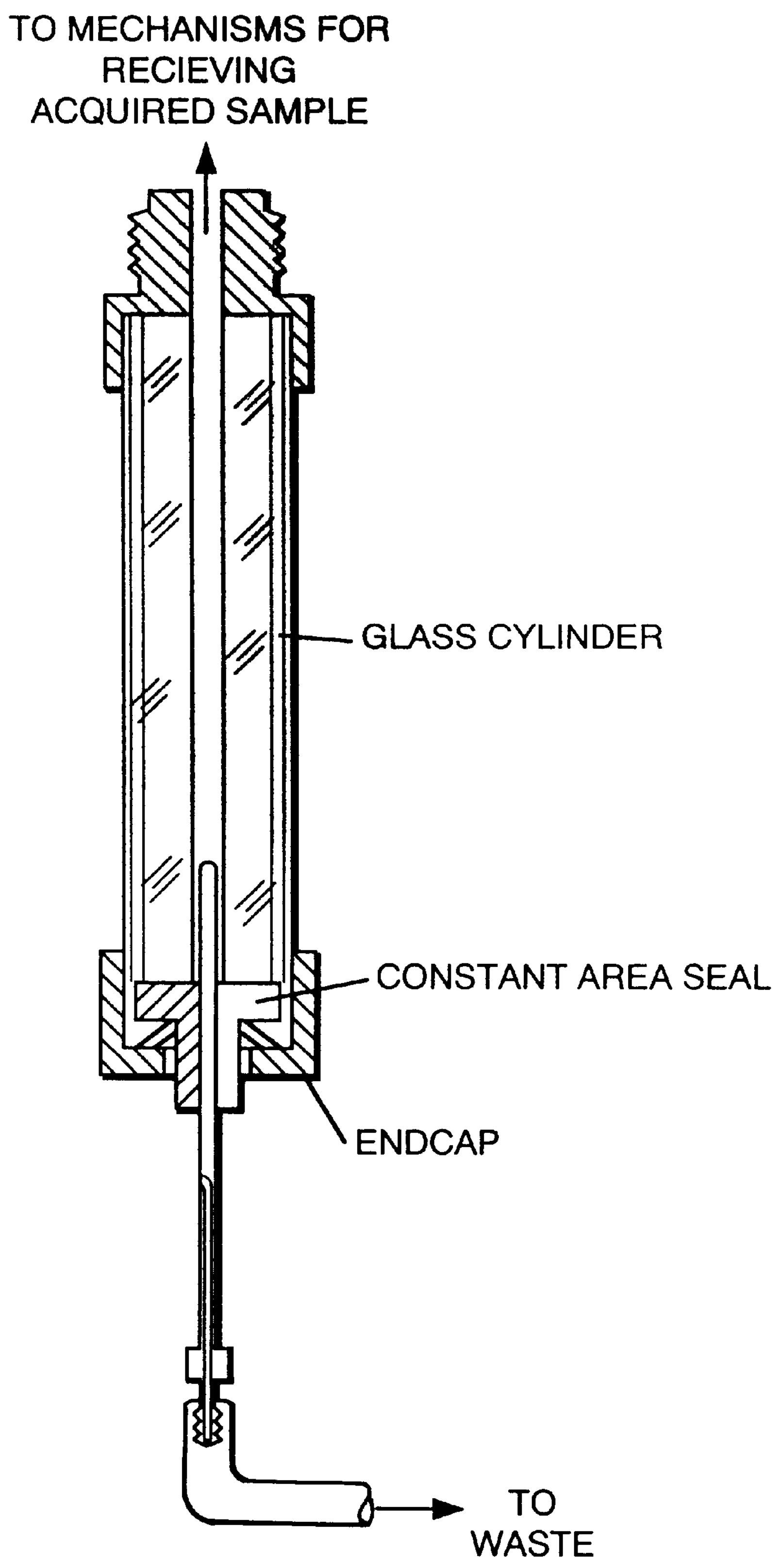
FIG. 5 is an illustration of still another alternative embodiment of an autosampler syringe according to the present invention.

Although, one embodiment described herein includes a Belleville washer to attach the constant area seal to the cylinder, one skilled in the art would appreciate that the constant area seal could be attached by other means such as heat bonding the cylinder to hold the constant area seal, including an end cap such as illustrated in FIG. 5, latches, hardware, mating threads or the like.

While the device described herein includes one or two seals, one skilled in the art would appreciate that still more seals may used as a function of the application.

Although the illustrative embodiment described herein includes a "cylinder" with a displacement rod disposed therein receiving the sample, it should be appreciated that other containers having geometric proportions other than cylindrical can be implemented. For instance a container having rectangular, hexagonal, triangular, pentagonal cross sections, or the like, could be implemented wherein the volume of sample displaced is a function of the dimensions of the displacement rod. Furthermore, it will be appreciated that the cross section of the displacement rod may be cylindrical, rectangular, hexagonal, triangular, pentagonal, or the like.

Although the invention has been shown and described with respect to exemplary embodiments thereof, various other changes, omissions and additions in the form and detail thereof may be made therein without departing from the spirit and scope of the invention.

What is claimed is:

1. A fluid transfer apparatus comprising:

a container having a first end and a second end and being made of a substantially rigid material, said container having a substantially hollow bore extending therethrough from said first end to said second end;

a constant area seal located at said first end, said constant area seal having an inside sealing surface and an exterior surface, wherein said container and said constant area seal are formed as a unitary structure constructed of a substantially rigid material;

a displacement rod slidably inserted through an opening in said constant area seal so that a portion of said displacement rod fits inside said container, said displacement rod contacting said inside sealing surface of said constant area seal while being slid in an out of said container through said constant area seal while a substantially fluid tight seal is maintained between said constant area seal and said displacement rod;

whereby a fluid sample is acquired in said substantially hollow bore as a function of the dimensions of said displacement rod and motion of said displacement rod in said hollow bore.

2. The fluid transfer apparatus of claim 1 wherein at least one of said constant area seal and said container is made of a material selected from a group consisting of Teflon, stainless steel, UHMW and PEEK.

3. The fluid transfer apparatus of claim 1 wherein said displacement rod further includes a cross hole and a passageway, said passageway being positionable within said container to vent an undesired fluid through said passageway to outside of said container.

4. The fluid transfer apparatus of claim 1 wherein an interior surface of said constant area seal is substantially compressible and said exterior surface is configured to receive a clamp to continuously constrict said constant area seal to seal said interior surface against said displacement rod.

5. The fluid transfer apparatus of claim 4 wherein said clamp is a split ring c-shaped clamp.

6. The fluid transfer apparatus of claim 1 wherein an interior surface and said exterior surface of said constant area seal are substantially compressible and a clamp is secured around said exterior surface to continuously constrict said constant area seal.

7. The fluid transfer apparatus of claim 6 wherein said clamp is a split ring c-shaped clamp.

8. The fluid transfer apparatus of claim 1, wherein said second end of said container comprises a static seal configured to be connected to mechanisms for receiving an acquired sample.

9. A fluid transfer apparatus comprising:

a container having a first end and a second end and being made of a substantially rigid material, said container having a substantially hollow bore extending therethrough from said first end to said second end;

a constant area seal located at said first end, said constant area seal having an inside sealing surface and an exterior surface;

a displacement rod slidably inserted through an opening in said constant area seal so that a portion of said displacement rod fits inside said container, said displacement rod contacting said inside sealing surface of said constant area seal while being slid in an out of said container through said constant area seal while a substantially fluid tight seal is maintained between said constant area seal and said displacement rod, wherein said displacement rod further includes a cross hole and a passageway, said passageway being positionable within said container to vent an undesired fluid through said passageway to outside of said container;

whereby a fluid sample is acquired in said substantially hollow bore as a function of the dimensions of said displacement rod and motion of said displacement rod in said hollow bore.

10. The fluid transfer apparatus of claim 9 wherein said container and said constant area seal are formed as a unitary structure constructed of a substantially rigid material.

11. The fluid transfer apparatus of claim 10 wherein said unitary structure is made of a material selected from at least one of UHMW and PEEK.

12. A fluid transfer apparatus comprising:

a container having a first end and a second end and being made of a substantially rigid material, said container having a sustantially hollow bore extending therethrough from said first end to said second end;

a constant area seal located at said first end, said constant area seal having an inside sealing surface and an exterior surface, wherein an interior surface of said constant area seal is substantially compliant and said exterior surface is configured to receive a clamp to continuously constrict said constant area seal to seal said interior surface against a displacement rod;

a split c-shaped clamp received on said exterior surface to continuously constrict said constant area seal;

a displacement rod slidably inserted through an opening in said constant area seal so that a portion of said displacement rod fits inside said container, said displacement rod contacting said inside sealing surface of said constant area seal while being slid in an out of said container through said constant area seal while a substantially fluid tight seal is maintained between said constant area seal and said displacement rod;

whereby a fluid sample is acquired in said substantially hollow bore as a function of the dimensions of said displacement rod and motion of said displacement rod in said hollow bore.

* * * * *